Aug. 8, 1950     E. E. LONGFELLOW     2,518,155
RACK
Filed Sept. 7, 1946     3 Sheets—Sheet 1
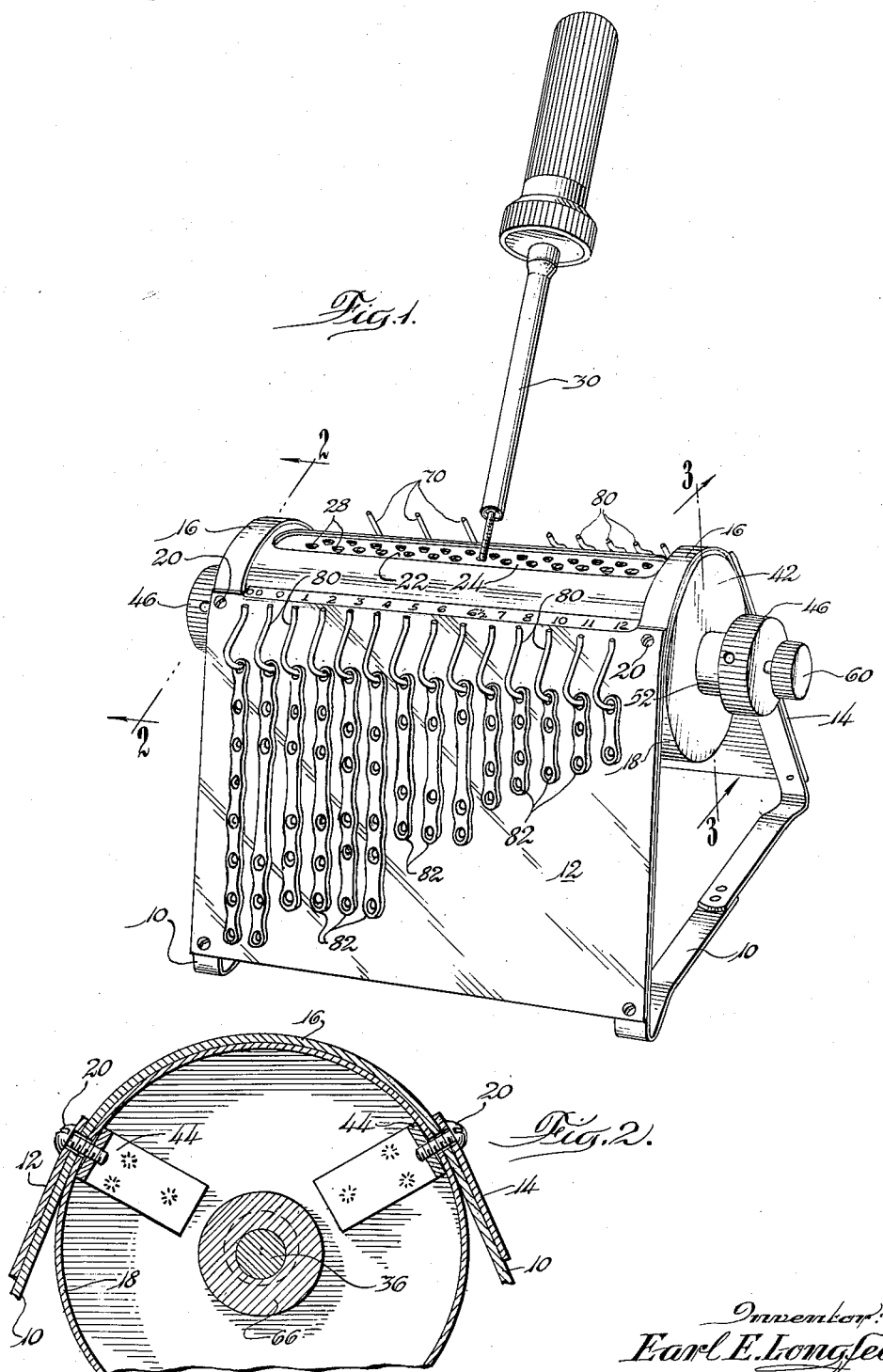
Inventor:
Earl E. Longfellow
By Hinkle, Horton, Ahlberg, Hausmann & Kupper
Attorneys.

Aug. 8, 1950     E. E. LONGFELLOW     2,518,155
RACK
Filed Sept. 7, 1946     3 Sheets-Sheet 2
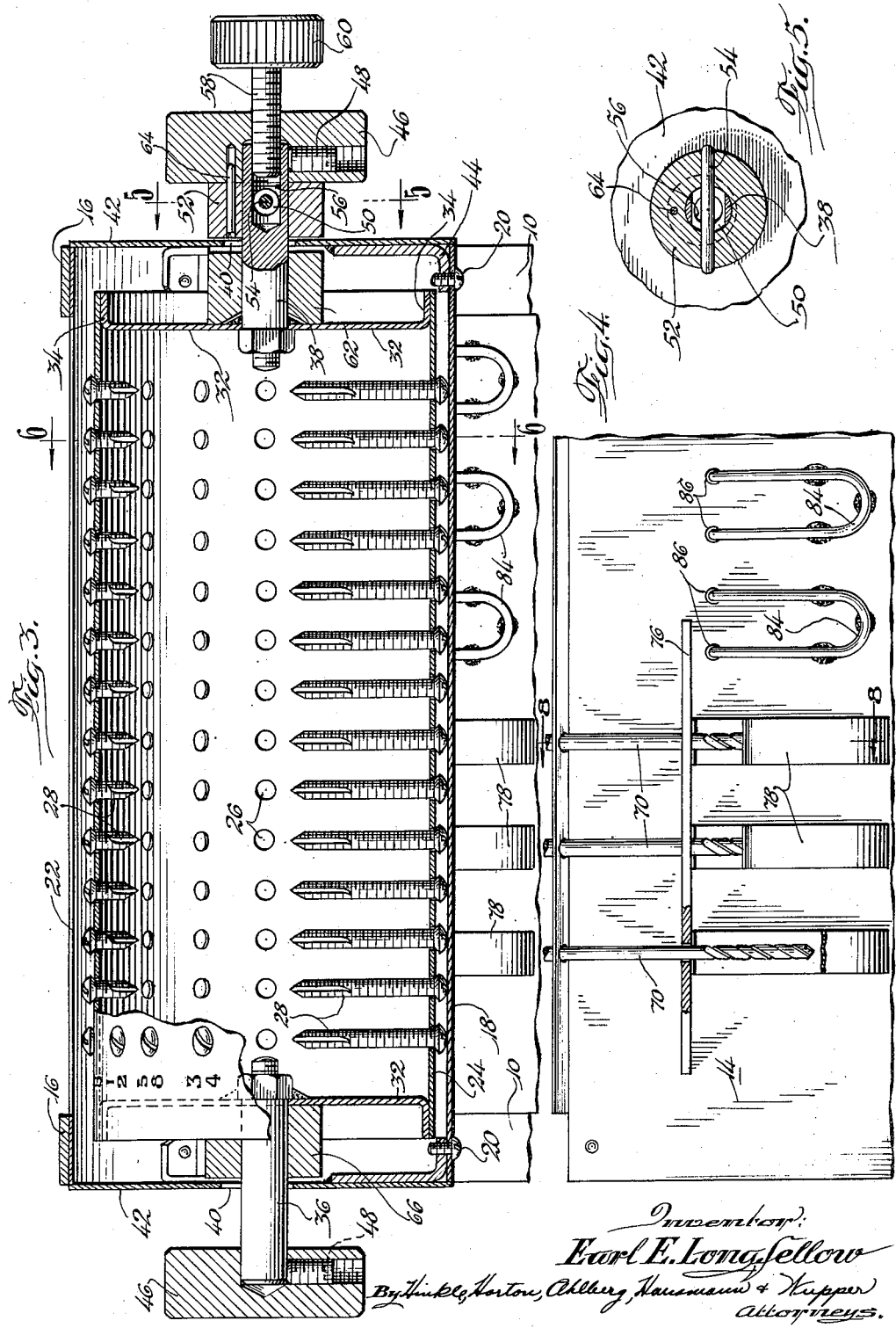
Inventor:
Earl E. Longfellow
By Hinkle, Horton, Ahlberg, Hausmann & Kupper
Attorneys.

Aug. 8, 1950 E. E. LONGFELLOW 2,518,155
RACK
Filed Sept. 7, 1946 3 Sheets-Sheet 3
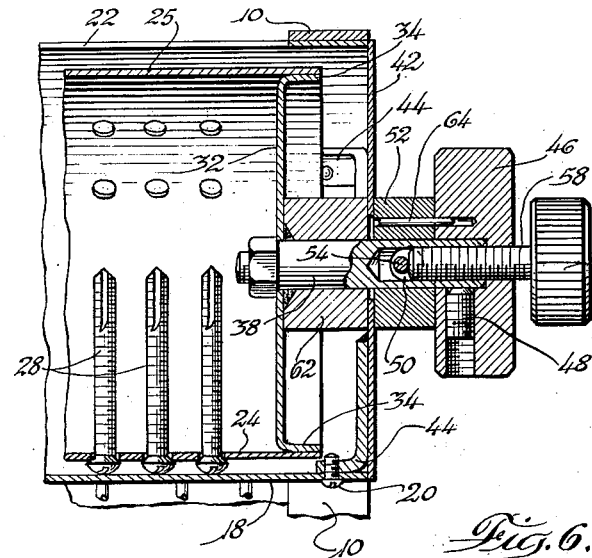
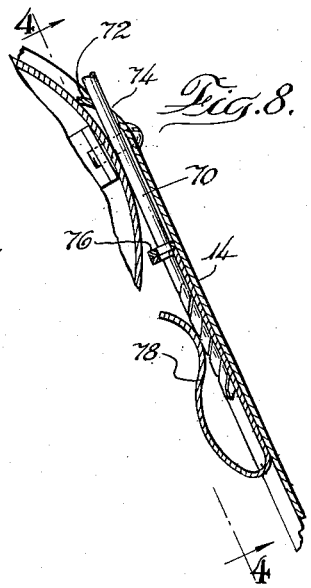
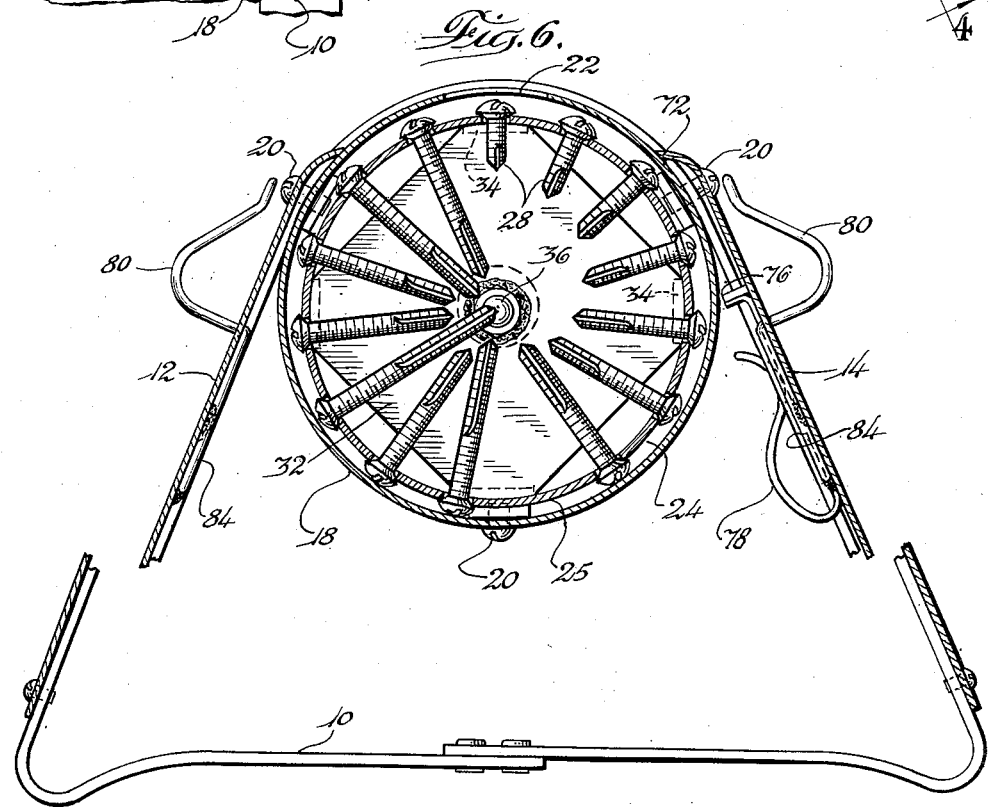
Inventor:
Earl E. Longfellow
By Hinkle, Horton, Ahlberg, Hauemann & Kupper
Attorneys.

Patented Aug. 8, 1950

2,518,155

UNITED STATES PATENT OFFICE 2,518,155

RACK

Earl E. Longfellow, Warsaw, Ind., assignor to
H. Herschel Leiter, Warsaw, Ind.

Application September 7, 1946, Serial No. 695,456

12 Claims. (Cl. 211—70)

This invention relates to a rack designed to hold several sizes of screws, with drills suitable for use therewith, and certain other small parts to be employed with the screws; and the particular embodiment of the invention shown and described herein is intended for the use of a surgeon in connection with the procedure known as "bone plating." In this operation the surgeon opens the tissue so as to uncover a substantial length of the bone in the vicinity of the fracture. The broken bone sections are then positioned in correct relation and a bone plate of stainless steel is secured to the bone, overlapping the fracture. The bone plate is fastened in place by drilling holes in the bone at positions to register with holes already formed in the bone plate, then inserting screws which are designed to form threads in the bone as they are entered in the drilled holes. The required length of screws and the proper length of bone plate must frequently be determined in the course of the operation and after the incision has been made; hence, it is important to have an assortment of screws and bone plates conveniently available and in sterilized condition, from which the surgeon can make his selection without delay.

One object of the invention is, therefore, to provide a convenient rack adapted to hold an assortment of bone plates, screws of several lengths and suitable drills for use in connection with the screws.

Another object of the invention is to provide a rack adapted to hold screws of several sizes in an orderly arrangement and with suitable indicia indicating the position of each size in the rack.

It is also an object of the invention to provide a rack adapted to hold bone plates, screws and drills or other small parts required for surgical use, said rack being adapted to be placed bodily in a sterilizer or autoclave without disarrangement or removal of the screws or other small parts carried thereby.

A further object of the invention is to provide a rack for screws or other small parts designed to display such parts in orderly arrangement and in a manner which indicates readily the approximate quantity of each size remaining in the rack so as to give notice when certain sizes should be replenished.

Still another object of the invention is to provide a magazine for screws or like parts in combination with a casing for the magazine, said casing having an opening adapted to expose only a limited portion of the magazine and the magazine being movable past the opening to present screws or other articles of different sizes successively at such opening, the magazine bearing indicia corresponding to the several sizes, all of which are concealed in the casing except that corresponding to the size of parts exposed at the opening.

More specifically, it is an object of the invention to provide, for small screws or like headed parts, a supply magazine of cylindrical form with individual apertures in which the shanks of the screws are loosely inserted with the heads of the screws exposed, and a casing also of cylindrical form in which the magazine is loosely cradled for rotation about its own axis, with the heads of the screws bearing against the inner surface of the casing as the magazine is turned therein.

An additional object of the invention is to provide, for screws or like headed parts, a rack which includes a rotatable magazine having apertures in which the shanks of said parts are loosely inserted and a casing in which the magazine is rotatably adjustable, together with means for securing the magazine against rotation at a selected position in the casing.

Other objects and advantages of the invention will appear from the following description, taken in connection with the drawings, in which:

Fig. 1 is a perspective view of a rack embodying this invention together with a special screw driver adapted for use in connection therewith and shown in the process of removing a screw from the rack;

Fig. 2 is a fragmentary detail section taken substantially in a vertical plane as indicated by the line 2—2 on Fig. 1;

Fig. 3 is a fragmentary vertical sectional view of the rack taken as indicated at line 3—3 on Fig. 1;

Fig. 4 is a fragmentary elevation showing the inner surface of one wall of the rack and being taken as indicated at line 4—4 on Fig. 8;

Fig. 5 is a detail section taken as indicated at line 5—5 on Fig. 3;

Fig. 6 is a fragmentary transverse vertical sectional view of the rack taken substantially as indicated at line 6—6 on Fig. 3;

Fig. 7 is a fragmentary sectional view of one end of the rack taken at the same plane as Fig. 3, but showing the clamping position; and Fig. 8 is a fragmentary vertical section taken as indicated at line 8—8 on Fig. 4.

While the particular structure shown in the drawings is especially adapted for surgical use, as above explained, it will be evident that its utility is not confined to this field. As shown, the rack comprises a pair of triangular supports or end frames 10, 10 which carry a sloping front wall 12 and a similarly inclined back wall 14 and which are curved or arched at their upper portions, as indicated at 16, to fit snugly around the upper side of a cylindrical casing 18. Screws 20 at the upper corners of the walls 12 and 14 extend through the frames 10 and into the casing 18 to hold the parts in assembled relation.

The upper side of the casing 18 is formed with a longitudinal slot or window 22 which exposes a portion of a cylindrical drum or magazine 24 fitting loosely within the casing 18 as seen in Fig. 3. The magazine 24 is hollow and its wall is perforated with a multiplicity of small apertures 26 preferably arranged in straight rows parallel to the axis of the magazine 24. These apertures serve to receive screws of various sizes, some of which are shown at 28 in Fig. 3, and which are arranged with their heads outside the cylindrical drum 24. The drum is so loosely mounted in the casing 18 that the heads of the screws 28 bear against the inner surface of the casing at the lower portion thereof and rub against it as the magazine 24 is rotated in the casing, but by such rotative adjustment any desired row of screws 28 may be brought opposite the slot or window 22 at the top of the casing 18 so as to be accessible for removal as needed. For surgical use the screws have heads of such a form that they can be picked up by means of a collet-type screw driver, such as that shown at 30 in Fig. 1 (which may be of the type disclosed and claimed in my application Serial No. 647,922, filed February 15, 1946). This enables the surgeon to employ only one hand for removing the screw from the magazine and placing it in position for use in securing a bone plate, leaving his other hand free for other work; and he can do this without actually handling the screw, except by means of the screw driver 30.

Each end of the cylindrical magazine 24 is fitted with a header plate 32 which is substantially square, as seen in Fig. 6, or of other polygonal outline, so that it does not completely close the ends of the magazine and thus provides free access for steam or heated air during the sterilizing of the rack and its contents. Each header plate may be formed with flanges 34 which are welded to the inner surface of the cylinder 24, and said headers carry rigidly extending shafts 36 and 38 which extend through openings 40 in the end caps 42 of the casing 18. These end caps have angle shaped lugs 44 welded to them which are provided with threaded apertures to receive the securing screws 20, certain of which serve to connect the magazine 18 with the supporting frames 10 as already noted.

The openings 40 in the end caps are considerably larger than the magazine shafts 36 and 38 so that the latter do not actually bear in the openings 40, but extend loosely through them. Knobs 46 are secured by set screws 48 to the outer ends of shafts 36 and 38 to enable the user to manually rotate the magazine drum 24 in the casing 18 so as to bring opposite the window 22 a row of screws of the desired size. To assist in this, suitable indicia are stamped or printed on the surface of the drum 24 at the end of each row of openings 26, said indicia indicating the size of screws carried in the openings. A fragment of the outer surface of the magazine 24 is shown in Fig. 3 at the left hand end of the view, this fragment bearing indicia of ½, ⅝ and ¾ to indicate that screws ½" long, ⅝" long and ¾" long are contained in the holes aligned with each of these markings. For surgical use, screws varying from ⅜ of an inch to 2 inches in length may be provided in a rack of this character.

When the rack is in use in the operating room, the drum 24 should be free to turn so that the surgeon can adjust it readily for selecting any length of screw which he may need; but preferably a limited area 25 of the drum, at least equal to the area of the slot 22, is unperforated so that this portion of the drum can be adjusted to a position opposite the slot or window 22 with none of the screws in the magazine exposed at said slot. Then if the drum be secured against rotation in this position, the rack may be carried about freely and may be placed in a sterilizer in any desired position without danger of dislodging any of the screws from their proper places in the drum.

The rack is secured in adjusted position by manually operable locking means associated with shaft 38. This shaft 38 has a transverse hole 50 and carries a collar 52 having a cross pin 54 fixed in the collar and extending through the hole 50 in the shaft. An axial bore 56 in the shaft 38 receives a screw 58 having a knurled head 60 exposed just beyond the knob 46 at the outer end of the shaft. A spacer 62 is carried on the shaft 38, normally with some clearance, between the header 32 of the drum 24 and the end cap 42 of the casing 18. When the screw 58 is adjusted inwardly to the position shown in Fig. 7, it engages the cross pin 54 and shifts the collar 52 along the shaft 38 into frictional engagement with the end cap 42 of the casing 18, and at the same time it pulls outwardly on the shaft 38 drawing the spacer 62 against the end cap 42, thus clamping the magazine drum 24 against rotation. Loosening the screw 58 releases the magazine for rotation and it may be turned by either of the knobs 46. The collar 52 is positively connected to the shaft 38 by one or more pins 64 slidably engaged in the adjacent knob 46, so that the collar will always turn with the knob and shaft but is movable axially along the shaft for its locking engagement with the end cap 42. At the opposite end of the drum the shaft 36 carries a spacer 66 between the header 32 and the end cap 42 of the casing.

Preferably all the screws employed for this class of work are of the same diameter or possibly of two different diameters; in the structure illustrated, it is assumed that the screws differ only in length. The rack is designed to carry a few drills of the proper size for preparing the bone to receive any of these screws so that if one drill should be broken, another will be immediately available. Three such drills are shown at 70, in Fig. 1, supported in the back wall of the rack. As seen in Figs. 6 and 8, this back wall 14 is formed at its upper edge with an inturned flange 72 formed with apertures 74, each adapted to receive one of the drills 70 so that said drills 70 may be entered through these openings and through registered openings in a rail 76 secured to the inner surface of the wall 14. The lower ends of the drills are then frictionally retained by spring clips 78 attached to the inner surface of the wall 14 as clearly shown in Figs. 4 and 8.

The front wall 12 and a portion of the rear wall 14 are provided with hooks 80 on which bone plates 82 of various lengths may be hung, as seen in Fig. 1. Preferably these hooks are made of round wire and are formed in pairs connected by a U-shaped bend of the wire, as seen at 84 in Figs. 3 and 4. These U-shaped portions are spot-welded to the inner surface of the wall 12 or the wall 14 with their hook-shaped ends extending through apertures 86 in the wall so that the hook portions 80 are presented at the outer faces of said walls. It will be evident that the rack may be tilted bodily into various positions without dislodging the bone plates from the hooks 80, and that the drills 70 will be frictionally held by the clips 78 regardless of the position of the rack, so that when the drum 24 is clamped with its blank area 25 opposite the window 22, there is little danger of dislodgment of any of the small parts carried by the rack.

While there is shown and described herein certain structure embodying my invention and illustrative thereof, it is to be understood that the invention is not limited thereto or thereby but includes all modifications, variations and equivalents coming within the scope of the appended claims.

Having thus described my invention, what I claim as new and desire to secure by Letters Patent is:

1. A rack of the character described, including a cylindrical magazine having a plurality of apertures in its cylindrical wall to receive the shanks of screws and to hold the same loosely with their heads exposed, a cylindrical casing having an internal diameter slightly larger than the diameter of the magazine plus double the axial height of the head of the largest screws carried by said magazine floatingly confining the magazine for rotation about its own axis, means supporting the casing with its axis substantially horizontal, said casing having an opening in its upper portion, and means for turning the magazine to bring the screws selectively opposite said opening for removal.

2. A rack as defined in claim 1, wherein said apertures are arranged in rows extending longitudinally of the cylindrical magazine, and said opening is dimensioned to expose a single row at a time.

3. A rack as defined in claim 1, wherein said apertures are arranged in rows extending longitudinally of the cylindrical magazine, and said opening is dimensioned to expose a single row at a time, and wherein said magazine has indicia on its surface adjacent each row of apertures, positioned to be exposed with the row at said opening to denote the size of screws carried in the apertures of that row.

4. A rack as defined in claim 1, wherein said apertures are arranged in rows extending longitudinally of the cylindrical magazine, and said opening is dimensioned to expose a single row at a time, and including means to lock the magazine against rotation at any selected position.

5. A rack as defined in claim 1, wherein said magazine has at least one portion of its cylindrical wall imperforate over an area corresponding substantially in size to the size of the opening in the cylindrical casing wall, and means to secure the magazine at that position.

6. A rack of the character described, including a cylindrical magazine having a plurality of apertures in its cylindrical wall adapted to receive the shanks of screws and to hold the same loosely with their heads exposed, a cylindrical casing within which the loaded magazine is confined for rotation about its own axis and which holds the screws, in the quadrants of the magazine in lowermost position, in said apertures, means supporting the casing with its axis substantially horizontal, said casing having an opening in its upper portion, said casing having end walls, a shaft secured axially in said cylinder and projecting through an end wall of the casing, means to rotate said shaft for turning the magazine within the casing, means forming a shoulder on said shaft adapted to engage the inner side of said end wall, a collar slidable on said shaft but engaged for rotation therewith, and means for adjusting said collar into clamping engagement with the outer side of said end wall.

7. A rack of the character described, including a cylindrical magazine having a plurality of apertures in its cylindrical wall adapted to receive the shanks of screws and to hold the same loosely with their heads exposed, a cylindrical casing within which the magazine is confined for rotation about its own axis and which holds the screws, in the quadrants of the magazine in lowermost position, in the apertures, means supporting the casing with its axis substantially horizontal, said casing having end walls and an opening in the upper portion of its cylindrical wall, a shaft secured axially to said magazine and projecting through an end wall of the casing, means to rotate said shaft for turning the magazine within the casing, means forming a shoulder on said shaft adapted to engage the inner side of said end wall, a collar slidable on said shaft, said shaft having an opening extending transversely through it and a threaded axial bore intersecting said opening, a cross pin secured in said collar and extending loosely through said opening in the shaft, and a screw in said bore adapted to be threaded in said bore into abutting engagement with the cross pin for adjusting said collar to bring the shoulder on the shaft and the collar into clamping engagement with said end wall.

8. A rack of the character described, including a cylindrical magazine having a plurality of apertures in its cylindrical wall adapted to receive the shanks of screws and to hold the same loosely with their heads exposed, a cylindrical casing within which the magazine is loosely confined and floatingly carried on the heads of the screws in the quadrants of the magazine which are in lowermost position for rotation about its own axis, means supporting the casing with its axis substantially horizontal, said casing having an opening in its upper portion and having end walls, shaft means secured axially relative to said magazine and projecting through openings in said end walls, said openings being substantially larger in diameter than said shaft means so that no support is provided thereby for the magazine and said casing being of sufficient diameter so that rotation of the magazine is not impeded but the screws in the portions of the magazine in lowermost position are held in the apertures by the side walls of the casing during rotation of the magazine, and means on said shaft means for turning the magazine.

9. A rack of the character described, including a cylindrical magazine having individual apertures to receive loosely the shanks of screws with their heads exposed for access, a cylindrical casing dimensioned loosely to receive and floatingly to support said magazine and having an opening dimensioned to expose only a portion of said screw heads, said magazine and casing being relatively rotatable for registering the screws selectively with said opening in the casing, and means for effecting relative rotation of said magazine and casing.

10. A rack of the character described, including a magazine having individual apertures to receive loosely the shanks of screws and hold the same with their heads exposed for access, a casing dimensioned floatingly to carry said magazine on said screw heads and having an opening dimensioned to expose only a portion of said screw heads, said magazine and casing being relatively movable for registering the screws selectively with said opening in the casing, and said magazine having an imperforate portion at least as large as said opening in the casing, said casing covering all of said apertures of the magazine when the imperforate portion is registered with said opening, whereby no screws are accessible when said portion of the magazine is so registered with said opening.

11. In combination, a cylindrical rack to hold a plurality of small articles with a portion thereof exposed, a cylindrical casing dimensioned so as floatingly to carry said rack, upon the exposed portion of the articles carried in the rack, for rotation relative to the casing, means for rotating said rack, said casing having an opening through which portions of the articles on the rack are rendered successively accessible by rotative adjustment of the rack, and means associated with said rotating means for locking said rack against rotation.

12. In combination, a rack to hold a plurality of small articles partly inside and partly outside the rack, a cylindrical casing dimensioned so as loosely to receive the rack and to support the latter floatingly, said casing having an opening through which portions of the articles on the rack are rendered successively accessible by rotative adjustment of the rack, said rack having an imperforate portion to close the opening in the casing when said imperforate portion is registered with said opening, and means for locking the rack with said imperforate portion registered with the opening.

EARL E. LONGFELLOW.

REFERENCES CITED

The following references are of record in the file of this patent:

UNITED STATES PATENTS

| Number | Name | Date |
|---|---|---|
| 379,055 | Dancyger | Mar. 6, 1888 |
| 484,165 | Scandlin | Oct. 11, 1892 |
| 631,874 | Mallard | Aug. 29, 1899 |
| 842,443 | Brown | Jan. 29, 1907 |
| 846,133 | McIntyre | Mar. 5, 1907 |
| 1,151,668 | Davis | Aug. 31, 1915 |
| 1,289,190 | Klein | Dec. 31, 1918 |
| 1,291,296 | Waite | Jan. 14, 1919 |
| 1,357,041 | Fritch | Oct. 26, 1920 |
| 1,474,281 | Needler | Nov. 13, 1923 |
| 1,528,875 | Funch | Mar. 10, 1925 |
| 2,017,088 | Bihler | Oct. 15, 1935 |
| 2,267,008 | Zimmer | Dec. 23, 1941 |